US 11,586,973 B2

(12) United States Patent
Frost et al.

(10) Patent No.: US 11,586,973 B2
(45) Date of Patent: Feb. 21, 2023

(54) DYNAMIC SOURCE RELIABILITY FORMULATION

(71) Applicant: International Business Machines Corporation, Armonk, NY (US)

(72) Inventors: Keith G. Frost, Delaware, OH (US); Stephen A. Boxwell, Columbus, OH (US); Stanley J. Vernier, Grove City, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 16/361,425

(22) Filed: Mar. 22, 2019

(65) Prior Publication Data
US 2020/0302336 A1 Sep. 24, 2020

(51) Int. Cl.
*G06N 20/00* (2019.01)
*G06N 5/02* (2006.01)
*G06F 40/30* (2020.01)

(52) U.S. Cl.
CPC ............. *G06N 20/00* (2019.01); *G06F 40/30* (2020.01); *G06N 5/02* (2013.01)

(58) Field of Classification Search
CPC .............................. G06N 20/00; G06K 9/6262
See application file for complete search history.

(56) References Cited

U.S. PATENT DOCUMENTS

| 9,240,128 | B2 * | 1/2016 | Bagchi ..................... G09B 7/00 |
| 9,910,912 | B2 | 3/2018 | Byron et al. |
| 10,001,457 | B2 | 6/2018 | Goldfine et al. |
| 2007/0073683 | A1 | 3/2007 | Kobayashi |
| 2011/0153654 | A1 | 6/2011 | Lee |
| 2013/0158984 | A1 | 6/2013 | Myslinski |
| 2013/0346356 | A1 * | 12/2013 | Welinder .............. G06F 16/285 706/52 |
| 2016/0125075 | A1 | 5/2016 | Eggebraaten |
| 2016/0140958 | A1 | 5/2016 | Heo |
| 2017/0046624 | A1 * | 2/2017 | Murdock, IV ........... G09B 7/02 |
| 2017/0316085 | A1 | 11/2017 | Gupta |
| 2018/0157934 | A1 * | 6/2018 | Hu ....................... G06K 9/6262 |
| 2018/0285743 | A1 | 10/2018 | Bringsjord |
| 2018/0350354 | A1 | 12/2018 | Mariaskin |

(Continued)

OTHER PUBLICATIONS

Sikdar, S., et al., Cutting Through the Noise: Defining Ground Trutch in Informaton Credibility on Twitter, ASE 2012.

(Continued)

*Primary Examiner* — William G Trost, IV
*Assistant Examiner* — Christopher P Cadorna
(74) *Attorney, Agent, or Firm* — Lieberman & Brandsdorfer, LLC

(57) ABSTRACT

Embodiments relate to an intelligent computer platform to use ground truth data to rate source reliability, and application of the source reliability. A computer system, computer program product, and computer implemented method apply the ground truth data to evaluate a source, assess source reliability, and dynamically apply the assessed reliability. The assessed reliability is dynamically applied to response data, with the application yielding selective presentation of the response data based on the applied reliability assessment.

20 Claims, 11 Drawing Sheets

(56) References Cited

U.S. PATENT DOCUMENTS

2021/0034817 A1    2/2021  Asao
2021/0133474 A1*   5/2021  Sawada ............... G06K 9/6293

OTHER PUBLICATIONS

Ma, F., et al., FaitCrowd: Fine Grained Truth Discovery for Crowdsourced Data Aggregation, KDD'15 Proceedings of the 21th ACM SIGKDD International Conference on Knowledge Discovery and Data Mining, Aug. 10-13, 2015, pp. 745-754.

Anonymous, Method to identify new source documents and enlarge corpora in question-answer systems by automated stylistic evaluation of uncurated text, Mar. 3, 2016.

Anonymous, System and method for generating question type distribution of a training set in a Question/Answering system, Dec. 2, 2014.

Anonymous, Method and Apparatus for Context Based Machine Learning Model, Sep. 10, 2016.

List of IBM Patents or Applications Treated as Related, Mar. 2019.

\* cited by examiner

DYNAMIC SOURCE RELIABILITY FORMULATION

BACKGROUND

The present embodiments relate to rating reliability of a source. More specifically, the embodiments relate to dynamically applying the source rating to source response data.

In the field of artificially intelligent computer systems, natural language systems (such as the IBM Watson® artificially intelligent computer system and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

SUMMARY

The embodiments include a system, computer program product, and method for dynamically assessing reliability.

In one aspect, a system is provided for use with an intelligent computer platform to dynamically assess reliability and provide corresponding response data for selective presentation. A processing unit is operatively coupled to memory and is in communication with a knowledge engine configured to assess source reliability. The knowledge engine is provided with tools to support the reliability assessment, including an assessment manager and a director. The assessment manager, in communication with the processing unit, is activated by the knowledge engine and employed to execute an initial assessment of reliability of a source, including evaluation of the source with respect to ground truth data, and calculation of a resource reliability score. The director functions to dynamically apply the assessed source reliability to a submission. This dynamic application includes obtaining source response data from a submission, and application of the source reliability score to the response data. The response data is selectively presented based on the applied source reliability.

In another aspect, a computer program device is provided for use with an intelligent computer platform to dynamically assess reliability. The device has program code embodied therewith. The program code is executable by a processing unit to assess reliability and provide corresponding response data for selective presentation. Program code is provided to assess source reliability, with the assessment including evaluation of a source with respect to ground truth data, and calculation of a resource reliability score. Program code is also provided to dynamically apply the assessed source reliability to a submission. This dynamic application includes the program code to obtain source response data from a submission, and application of the source reliability score to the response data. The response data is selectively presented based on the applied source reliability.

In yet another aspect, a method is provided for use by an intelligent computer platform for use with an intelligent computer platform to dynamically assess reliability and provide corresponding response data for selective presentation. An initial assessment of reliability of a source is executed, including evaluating the source with respect to ground truth data, and calculating a resource reliability score. The assessed source reliability is dynamically applied to a submission. This dynamic application includes obtaining source response data from a submission, and application of the source reliability score to the response data. The response data is selectively presented based on the applied source reliability.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Ground truth data refers to information provided by direct observation. With respect to AI and ML, ground truth is a measurable data set, and in one embodiment may be a collection of vetted data. It is understood in the art that a source, such as a library or corpus, contains documents with data therein. Data that populates the source, e.g. source data, may come from different venues, and may not have been subject to review for accuracy prior to being populated into the source. The source data may be factually accurate, or in one embodiment, the data may be factually inaccurate. As shown and described herein, tools and a corresponding method are provided to apply ground truth data to the source data to assess reliability of the source, and to apply the assessed reliability to response data that is generated from a submitted query.

Figure 1:
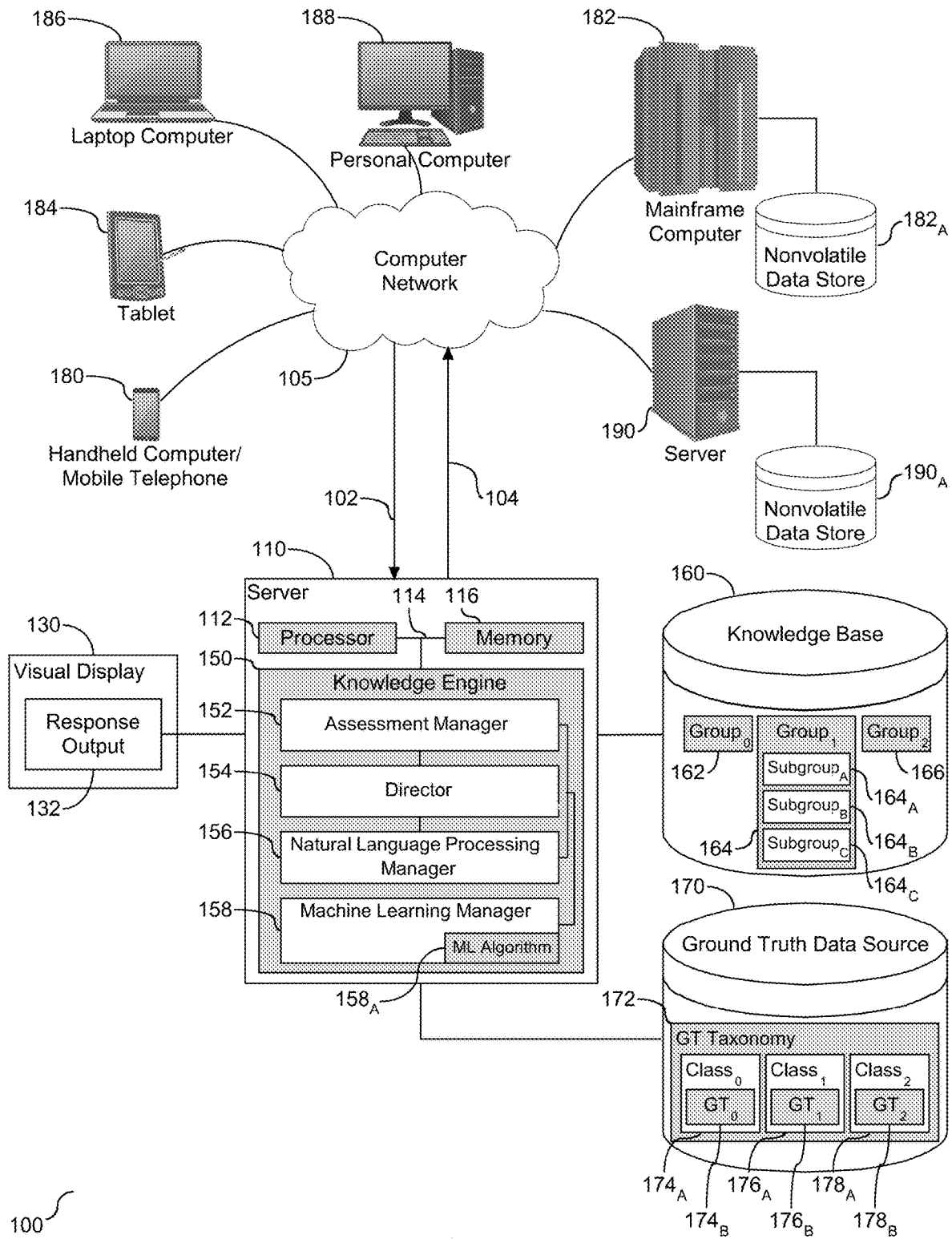
FIG. 1 depicts a system diagram illustrating a system connected in a network environment that supports reliability assessment.

Referring to FIG. 1, a schematic diagram of a computer system (100) to support reliability assessment is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with a knowledge engine (150) to evaluate source data reliability over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The knowledge engine (150) is shown herein configured to receive input (102) from various sources. For example, knowledge engine (150) may receive input from the network (105) and leverage a data source (160), also referred to herein as a corpus or knowledge base, to create output or response content. As shown, the data source (160) is configured with logically grouped documents or files, including $group_0$ (162), $group_1$ (164), and $group_2$ (166). Although three groups of documents are shown, the quantity should not be considered limiting. In one embodiment, the data source (160) may include additional groups of documents or files, or in another embodiment, a reduced quantity of groups of documents or files. Each group of documents in the data source may be organized by common subjects or themes, although this is not a requirement. Data that is populated into and forms the group may be from similar or dissimilar sources. There is no restriction on the origination of the data that is populated into the groups.

As shown and described herein, ground truth data is applied to assess reliability of one or more documents and one or more data sources. The ground truth data is comprised of a set of factually accurate questions and corresponding answers. A ground truth data source (170) is shown herein operatively coupled to the server (110). The data source (170) is populated with groups or compilations of ground truth data, shown herein as $GT_0$ ($174_B$), $GT_1$ ($176_B$), and $GT_2$ ($178_B$). Although three compilations of ground truth data are shown, the quantity should not be considered limiting. It is understood that the ground truth data may be organized in a taxonomy, referred to herein as a ground truth taxonomy (172), and the groups of compilations of ground truth data (174)-(178) may have the same or different classifications within the ground truth taxonomy. In the example shown herein, the ground truth taxonomy (172) is shown with three classifications, including $class_0$ ($174_A$), $class_1$ ($176_A$), and $class_2$ ($178_A$), with each classification having appropriately assigned ground truth data, shown herein as $GT_0$ ($174_B$) assigned to $class_0$ ($174_A$), $GT_1$ ($176_B$) assigned to $class_1$ ($176_A$), and $GT_2$ ($178_B$) assigned to $class_2$ ($178_A$). Although the taxonomy (172) only shows three classifications, the quantity should not be considered limiting. Each of the ground truth compilations are organized by one or more characteristics, such as subject matter, so that they can be appropriately organized within the ground truth taxonomy (172) and applied to a similarly classified document or source for reliability assessment. In one embodiment, the organization and management of the ground truth compilations is restricted to maintain the integrity of the underlying data. Accordingly, the data source (170) is operatively coupled to the server (110) so that it may be leveraged by the knowledge engine (150) in the source reliability assessment.

The various computing devices (180), (182), (184), (186), (188), and (190) in communication with the network (105) may include access points for the logically grouped documents or files of the data source (160) and the ground truth data source (170). The knowledge engine (150) functions as a platform to evaluate source reliability and to generate corresponding response output data (132). In one embodiment, the knowledge engine (150) communicates response output (132) to a visual display (130), shown herein operatively coupled to the server (110) or one or more of the computing devices (180)-(190) across network connection (104).

The network (105) may include local network connections and remote connections in various embodiments, such that the knowledge engine (150) may operate in environments of any size, including local and global, e.g. the Internet. The knowledge engine (150) serves as a front-end system that can make available a variety of knowledge extracted from or represented in documents, network accessible sources and/or structured data sources. In this manner, some processes populate the knowledge engine (150), with the knowledge engine (150) also including input interfaces to receive requests and respond accordingly.

As shown, content may be in the form of one or more logically grouped documents or files (162)-(166) for use as part of the data source (160) of data with the knowledge engine (150). The data source (160) may include any structured and unstructured documents, including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively determine an output response related to the input by searching content in the data source (160) or any electronic data source operatively coupled to the server (110) across the network (105).

The knowledge engine (150) is shown herein with several tools to support content processing and reliability assessment, including an assessment manager (152), a director (154), a natural language processing (NLP) manager (156), and a machine learning (ML) manager (158). The assessment manager (152) functions to conduct an assessment analysis, which may be conducted on different levels. For example, the assessment analysis may be conducted on a source to evaluate reliability of the source with respect to the data contained therein. Similarly, as shown and described in FIGS. 5A and 5B, the assessment analysis may be conducted on a document prior to submission to a source. As describe above, each logically grouped set of documents or files (162)-(166) may have individual common elements. For example, in one embodiment $group_0$ (162) may house documents and files related to athletics, $group_1$ (164) may house documents and files related to science, and $group_2$ (166) may house documents and files related to politics. Similarly, in one embodiment, one or more of the groups may contain sub-groups of documents or files with further delineation. For example, in one embodiment $group_1$ (164) may have $sub-group_A$ ($164_A$) for documents related to physics, $sub-group_B$ ($164_B$) for documents related to chemistry, and $sub-group_C$ ($164_C$) for documents related to computer science. These sub-groups are merely an example of a further division or separation of documents and files in the data source (160), and should not be considered limiting.

On the source assessment level, the assessment manager (152) functions as a tool, either a software tool or a hardware tool, to evaluate reliability of a source, such as one or more of the logically grouped documents or files (162)-(166), or in one embodiment, a sub-group. Based on selection or identification of one of the logical groups or sub-groups, the assessment manager (152) identifies an appropriate or corresponding set of ground truth data, such as at least one of $GT_0$ ($174_B$), $GT_1$ ($176_B$), and $GT_2$ ($178_B$), from the ground truth data source (170). In one embodiment, the assessment manager (152) identifies a common characteristic of the data source and the ground truth. The assessment manager (152) presents or submits the ground truth question and answer data to the identified source data and receives source answer data, e.g. the ground truth data is static. The assessment manager (152) evaluates the received source answer data, and calculates a source reliability score, which is based on the presented ground truth data and the source answer data. Further details of the assessment are shown and described collectively in FIGS. 3A and 3B. Accordingly, the initial assessment is directed at presentation of the ground truth data and evaluation with respect to source answer data.

The source reliability may be performed prior to receipt of a submission, or in one embodiment, may be conducted dynamically with respect to submission of a document or file, e.g. (162)-(166), to the source. The dynamic assessment leverages the assessment manager (152) to dynamically apply ground truth question and answer data to a document or file presented to the source. The assessment manager (152) calculates a corresponding document reliability score for the presented document or file. It is understood in the art that in one embodiment, all assessed documents are submitted to the source regardless of the document reliability score. Similarly, in one embodiment, the documents may be selectively received by the source, with the selection based on the assessed document reliability score. Accordingly, the assessment manager (152) is configured with the ability to evaluate and assess document reliability for selective receipt of the document by the source.

The director (154), which is operatively coupled to the assessment manager (152), functions as a tool, either as a hardware tool or a software tool, to dynamically apply the source reliability to a received submission, such as a query. When the submission is processed, response data is generated. The response data may be a single response, or in one embodiment, may include a plurality of responses, e.g. a list or grouping of responses. For example, when a query is presented to a search engine, a list of responses is provided in some form of an order. It is understood that in one embodiment not all of the responses in the list are from the same group or sub-group in the data source. The director (154) obtains the response data and applies the source reliability score to the response data. Details of the source reliability application to the query responses are shown and described in FIG. 4, including obtaining and applying an answer occurrence score.

The application of the assessed source reliability to the submission returns one or more answers or replies, hereinafter referred to collectively as response data. In the case of a single answer or reply, the response data is presented as a response to the submission. However, it is understood that a plurality of response data may be generated, in which case the director (154) sorts or otherwise organizes the response data based on their respective final response scores. It is understood that there may be multiple occurrences of the same answer in different documents within the source, and the final score reflects how well the question was answered. In one embodiment, the director (154) applies indicia to the response data with the indicia reflecting the final scores. In one embodiment, the indicia applied to the scores indicate reliability of the response or document that provided the response data. Examples of the applied indicia include, but are not limited to, a value, symbol, and/or a visible property or characteristic. Based on the value of the final response score, one or more responses are selectively presented as an answer to the submitted question.

The response data, as processed by the director (154), may be subject to further adjustment. Each response to the submission has a corresponding confidence value directed at reliability of the source of the response. The confidence value is related to the strength of relevance of the response to the submitted question. In one embodiment, the confidence value ranges from 0.1 to 1.0, with a high number within the range corresponding a strong relevance. The adjustment is conducted by the director (154), which applies the confidence value of the source, e.g. source reliability, to the response data, which in one embodiment causes an adjustment of a weighting of the source response data. Details of the confidence value and application thereof are shown and described in FIG. 4. Accordingly, the response data may be subject to further evaluation and assessment through application of source reliability.

The assessment manager (152) may present the submission to a single source and receive and evaluate corresponding response data. However, the assessment manager (152) is not limited to a single source, and in one embodiment, the assessment manager (152) may present the submission to multiple sources, such as a first source and a second source. In this example, the assessment manager (152) conducts the same functionality as with a single source, but instead of applying a single reliability score, the director (154) applies a first reliability score to data from the first source and applies a second reliability score to data from the second source, and conducts a sorting or organization of the response data based on their respective reliability scores.

The assessment manager (152) functions as a software or hardware tool to detect and process a received submission with respect to reliability, and corresponding ground-truth data. The submission may be received in different formats. As shown, a natural language processing (NLP) manager (156) is provided operatively coupled to the assessment manager (152) and the director (154). The NLP manager (156) functions as a tool to facilitate processing of a submission received in natural language form. For example, in one embodiment, the NLP manager (156) detects a communication and effectively translates the communication to text, and detects grammatical components within the received natural language (NL) context, etc. The detected and processed NL submission is forwarded from the NLP manager (156) to the assessment manager (152) for source reliability processing and assessment.

The NLP manager (156) is employed to detect and observe the electronic communication. In one embodiment, the communication is on-going, and the NLP manager (156) functions in real-time to detect and observe the communication. For example, in one embodiment, the NLP manager (156) observes communication channels to ascertain if there is an on-going communication, e.g. live text based communication. In one embodiment, the NLP manager (156) functions as a background tool or process for the electronic communication detection and observation. As shown, the NLP manager (156) is operatively coupled to the assessment manager (152) and the director (154) to process submissions detected within the communication channels. The NLP manager (156) utilizes NLP protocols to interpret an expression and an associated intent with the electronic communication. In one embodiment, the NL manager (156) identifies grammatical components, such as nouns, verbs, adjectives, punctuation, punctuation marks, etc. in the electronic communication. Similarly, in one embodiment, one or more reasoning algorithms may look at temporal or spatial features in language of the electronic communication. In one embodiment, the NLP manager (156) converts the electronic communication to well-formed content, e.g. natural language text, so that the content may be interpreted by the assessment manager (152), and the director (154) may obtain response output (132). Accordingly, the NLP manager (156) functions to dynamically support and process natural language input and corresponding communication(s).

It is understood that the submission may be in the form of an interrogatory soliciting an answer. The interrogatory may be expressly exhibited in the communication. For example, the NLP manager (156) may identify an interrogatory mark within the punctuation, which is an express characteristic of a corresponding interrogatory. It is also understood that the interrogatory may be inherently present in the communication. For example, an interrogatory punctuation mark may not be present, but a grammatical evaluation of the communication may demonstrate that the interrogatory is present. Accordingly, the NLP manager (156) may parse through the observed communication to identify the presence of an interrogatory within the communication.

Once an interrogatory is ascertained and identified, the interrogatory is processed to ascertain the intent, e.g. meaning, of the interrogatory so that an appropriate source for processing the submission may be ascertained. The NLP manager (156) resolves the interrogatory. More specifically, the NLP manager (156) applies natural language processing (NLP) to the identified interrogatory and parses the identified interrogatory into two or more grammatical components. An example of such components includes, but is not limited to, nouns, verbs, verb phrases, pronouns, adjectives, subjects, objects, and in one embodiment punctuation marks. Similarly, in one embodiment, the grammatical component identification includes the location of the identified component within the electronic communication. It is understood that the subjects of an interrogatory may be placed after the verb or between parts of the verb phrase. The NLP manager (156) utilizes the parsed components of the communication to identify an intent of the submission, e.g. interrogatory. The intent correlates to a meaning, purpose, and/or goal expressed in the submission. Before the submission can be resolved, it is understood that the intent must be identified and resolved. In one embodiment, the intent may be the subject of the submission. NLP is the science of extracting the intention of text and relevant information from text. In one embodiment, words or phrases present in the submission or present in the communication associated with the interrogatory provide clarification or context to the intent. Accordingly, the NLP manager (156) evaluates context associated with the submission to understand and define the intent.

The intent of the submission correlates to a meaning or subject of the submission. The NLP manager (156) subjects the identified intent to discovery and/or analysis to facilitate and enable resolution of the submission, e.g. a response. It is understood that the goal is not merely to provide a response to the interrogatory, but to provide an accurate response to the interrogatory. The analysis includes the NLP manager (156) mapping the identified intent of the interrogatory to a content source or a source that would contain accurate content for the response. It is understood that in one embodiment there may be a plurality of sources available as the content source. In one embodiment, the NLP manager (156) applies the identified grammatical components and subject of the communication to determine the content source. In one embodiment, the communication may identify the content source based on the subject of the communication. Accordingly, the first aspect of the analysis is directed at determining and designating an appropriate content source, and mapping the intent to the designated content source.

Once the intent is identified and the intent is mapped to the content source, the director (154) ascertains response content present within the content source and related to the identified submission. It is understood that in one embodiment, the content source may have an abundant quantity of content, and the director (154) needs to separate or categorize the content and determine which content, if any, is related to the identified submission. Response output (132) in the form of one or more answers or replies to the submission is identified. It is understood that in one embodiment, the director (154) may identify a plurality of viable response content, hereinafter referred to as candidate responses, and further functions to resolve and provide the response output (132). In one embodiment, the director (154) identifies relevant candidate responses within the content, applies a confidence or relevance score to each identified candidate response, conducts a ranking or sorting of the candidate responses based on the applied confidence score, and selects at least one of the candidate responses based on the ranking or sorting. Accordingly, the director (154) functions to identify, and in one embodiment, resolve, the response output (132) to the identified submission.

As discussed above, a source may include a compilation or grouping of documents or files, hereinafter referred to collectively as documents. It is understood that a source may be configured to selectively receive documents. More specifically, to maintain the integrity of the source, it may be necessary or suggested that each document be assessed for reliability and selectively presented to the source for acceptance based on the assessed reliability. With respect to an assessment on the document level, the assessment manager (152) is configured to identify the document(s) for evaluation. Similarly, the NLP manager (156) is configured to identify and extract statements within the identified documents. The assessment manager (152) subjects the identified statements to an accuracy evaluation, which includes application of ground truth question-answer data to the statements, from which answer data is generated. The director (154), which is operatively coupled to the assessment manager (152), and the NLP manager (156), conducts an evaluation of the document by application of the statement accuracy evaluation. The evaluation includes calculation of document reliability based on the generated answer data from each of the identified statements in the document. An outcome in the form of selective acceptance of the document to an appropriate designated source, e.g. one of sources (162), (164), or (166), is generated. The outcome is selective in that it is based on the calculated document reliability. In the event of the source accepting the document, the director (154) dynamically assesses, or in one embodiment re-assesses, reliability of the source.

As described herein with respect to document assessment, the NLP manager (156) evaluates the document to identify statements therein. It is understood that each statement has associated context that defines statement characteristics, such as the circumstances that form the setting for an event, statement, or idea, and in terms of which the statement can be fully understood and assessed. In addition to identification of document statements, the NLP manager (156) evaluates context within the document, which includes identification of context within the identified statements. As shown and described with respect to the ground truth data source (170), the ground truth data is organized into a taxonomy, such as the ground truth taxonomy (172). The NLP manager (156) leverages the taxonomy (172) to identify ground truth questions and answer data that are relevant to the identified context of the statements in a manner such that there is a direct correspondence between the statement context and the taxonomy (172). The taxonomy (172) may also be leveraged for document classification. Once the document assessment is completed, the document is assigned to a classification, which in one embodiment is determined by the ground truth taxonomy (172) based on the class of ground truth data applied to the statement assessment. As described above, the sources may also be organized into classes or a classification system. The assessment manager (152) is responsible for document source assignment, including identification of a source classification and evaluation of the source classification with respect to the document classification, and selective submission of the document to a source with a corresponding source classification and responsive to the source and document classification evaluation. Accordingly, the document is characterized with a classification and selectively submitted to a corresponding and appropriately classified source responsive to the reliability assessment.

As further shown, a machine learning (ML) manager (158) is provided operatively coupled to the assessment manager (152) and the director (154). The ML manager (158) is provided to apply a ML algorithm ($158_A$) to one or more data sources. It is understood in the art that submission of a query is received or processed into string format. In one embodiment, the NLP manager (156) may effectively translate a submission received in speech form to corresponding string(s), also referred to herein as string data. The ML manager (158) through use of the ML algorithm ($158_A$) evaluates the source answers received from processing the submission, e.g. query. Each source answer includes corresponding string data with one or more feature values. The ML manager (158) identifies a source answer feature, such as a passage or content within the source or source document that relates to the intent of the submission under investigation. Each source answer feature has a corresponding feature value. The ML algorithm ($158_A$) assesses a correlation between each source answer feature value and the assessment source reliability score, and applies the correlation to the source response data. The correlation enables the ML manager (158) to determine if reliability is important to the source. For example, a strong correlation corresponds with the response data being a correct reply to the submission. Accordingly, the correlation functions as a factor in application of the source reliability score to the resource response data.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive the detected electronic communication as input content (102) which it then analyzes to identify characteristics of the content (102) that in turn are applied to the corpus of data (160). Based on application of the content (102) to the corpus of data (160), a set of candidate outcomes are generated by looking across the corpus of data (160) for portions of the corpus of data (160) that have some potential for containing a response matching or corresponding to intent of the identified content characteristic(s) of the content (102).

The response output (132) is directed at specific content. For example, in one embodiment, the response output (132) may be a direct answer to the interrogatory. In one embodiment, the response output (132) may be in the form of a link to a source for the response content. Similarly, in one embodiment, the response output (132) may include both content and the source link. Accordingly, the content of the response may come in different forms, or a combination of forms.

The assessment manager (152), director (154), NLP manager (156), and ML manager (158), hereinafter referred to collectively as AI tools or knowledge engine tools, are shown as being embodied in or integrated within the knowledge engine (150) of the server (110). The AI tools may be implemented in a separate computing system (e.g., 190) that is connected across network (105) to the server (110). Wherever embodied, the AI tools function to evaluate an electronic communication(s), assess source reliability, and process the communication(s) with respect to the assessed source reliability so that a corresponding and accurate response and response content detected may be communicated as response content (132) to the identified submission(s).

In selected example embodiments, the NLP manager (156) may be configured to apply NL processing to identify the intent of the identified submission(s) by mapping parsed terms and phrases from the submission to potential source content. For example, the NLP manager (156) may perform a sentence structure analysis, with the analysis entailing a parse of the subject sentence(s) and the parse to denote grammatical terms and parts of speech. In one embodiment, the NLP manager (156) may use a Slot Grammar Logic (SGL) parser to perform the parsing. The ML manager (158), shown herein operatively coupled to the assessment manager (152) and director (154), may also be configured to apply one or more learning methods to match detected content to known submissions or patterns of submissions to decide and categorize the corresponding intent of the submission.

Types of information handling systems that can utilize the knowledge engine (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188), and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$)). The nonvolatile data store ($182_A$) can be a component that is external to the various information handling systems or can be internal to one of the information handling systems.

The information handling system employed to support the knowledge engine (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 2:
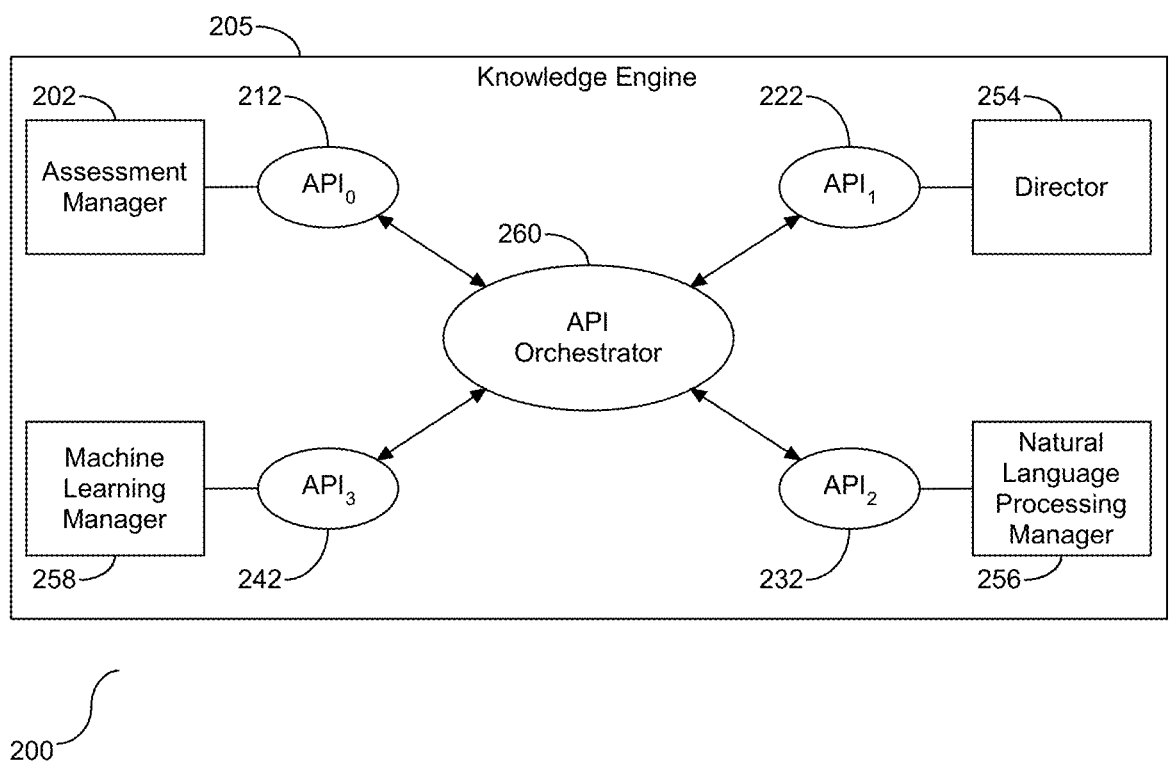
FIG. 2 depicts a block diagram illustrating the reliability assessment tools, as shown and described in FIG. 1, and their associated application program interfaces.

An Application Program Interface (API) is understood in the art as a software intermediary between two or more applications. With respect to the knowledge engine (150) shown and described in FIG. 1, one or more APIs may be utilized to support one or more of the tools (152)-(158) and their associated functionality. Referring to FIG. 2, a block diagram (200) is provided illustrating the tools (152)-(158) and their associated APIs. As shown, a plurality of tools are embedded within the knowledge engine (205), with the tools including the assessment manager (252) associated with $API_0$ (212), the director (254) associated with $API_1$ (222), the NLP manager (256) associated with $API_2$ (232), and the ML manager (258) associated with $API_3$ (242). Each of the APIs may be implemented in one or more languages and interface specifications. $API_0$ (212) provides functional support to assess reliability of a source; $API_1$ (222) provides functional support to dynamically apply the source reliability to a submission; $API_2$ (232) provides functional support to apply NLP to the received submission(s); and $API_3$ (242) provides functional support to apply ML and a corresponding ML algorithm to the source with respect to the received submission(s). As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3A:
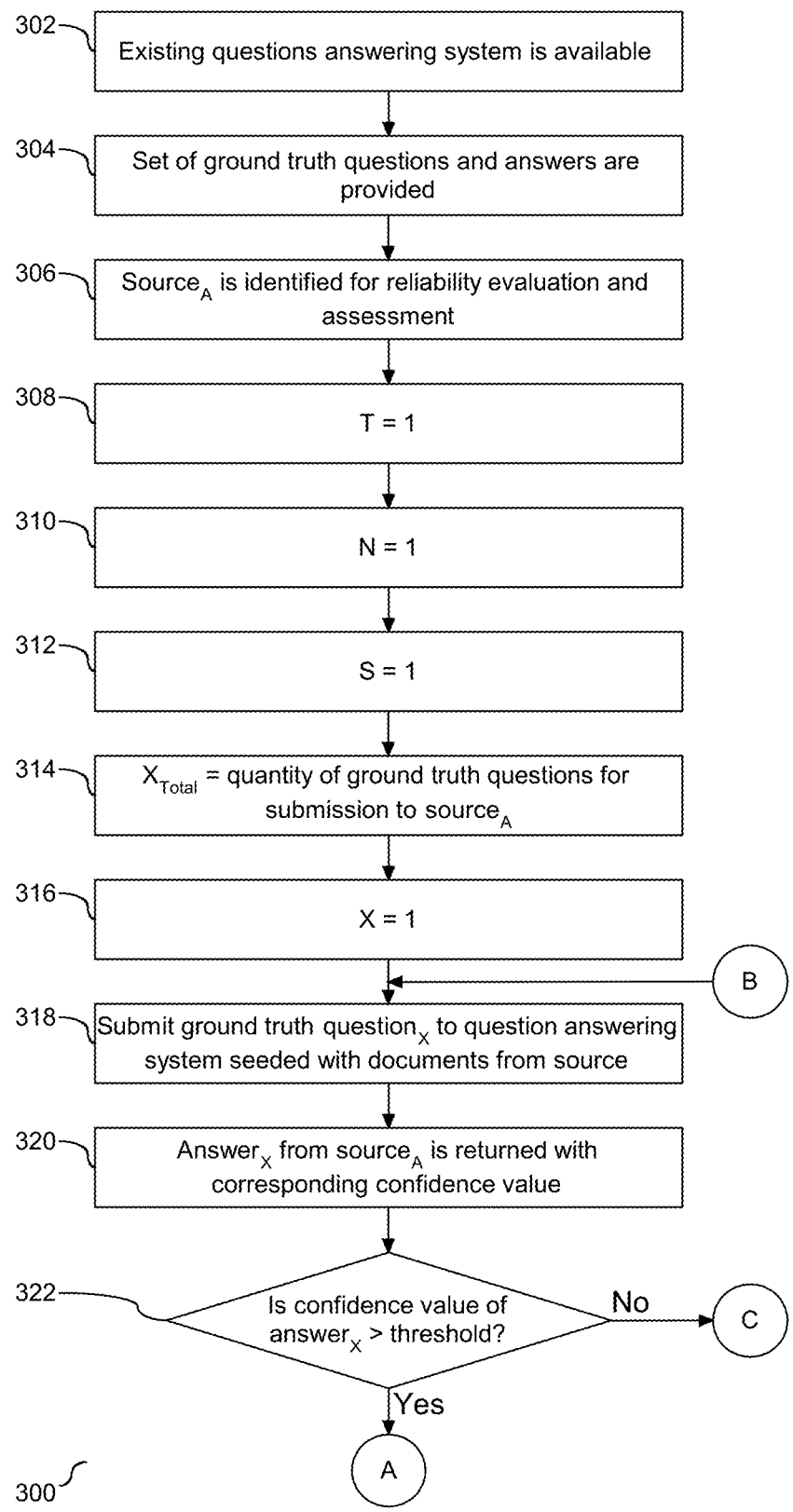
FIGS. 3A and 3B collectively depict a flow chart illustrating a process for evaluating source reliability.
Figure 3B:
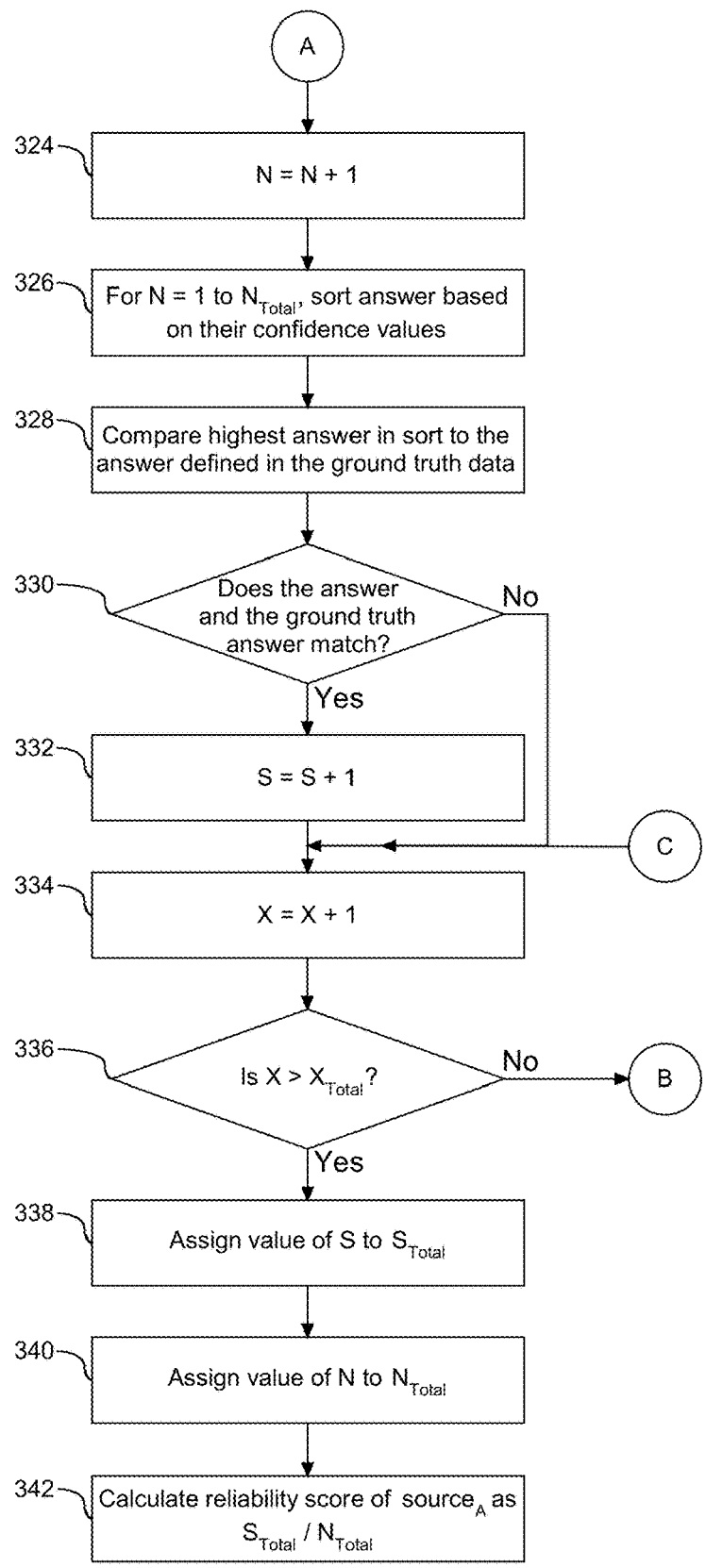

Referring collectively to FIGS. 3A and 3B, a flow chart (300) is provided illustrating a process for evaluating a source with respect to reliability, e.g. accuracy, of source data. Prior to the evaluation, several aspects are provided or known. An existing questions answering system is available (302), and a set of ground truth questions and corresponding ground truth answers has already been created and is provided or otherwise available (304). It is understood that a source, $source_A$, such as a library or collection of documents, is available or otherwise identified for reliability evaluation and assessment (306). Several variables are defined and/or initialized, including T which is a configured threshold defining a high confidence answer (308), N which is a count of questions answered confidently (310), and S which is a count of reliable answers (312). The variable $X_{Total}$ is assigned to a quantity of ground truth questions for submission to $source_A$ (314). A ground truth question counting variable, X, is initialized (316), followed by submission of ground truth $question_X$ to the available question answering system that is seeded only with documents from $source_A$ (318). An answer, $answer_X$, from $source_A$ is returned together with a corresponding confidence value of the source of the answer (320). The confidence value is directed at relevance, and the strength of relevance of the answer to the submitted question. In one embodiment, the confidence value ranges from 0.1 to 1.0, with a high number within the range corresponding to a strong relevance. In one embodiment, the NLP manager, shown and described in FIG. 1, is leveraged to calculate how relevant the answer is estimated to be with respect to the query submission of $question_X$. The NLP may compare parts of speech, grammatical components, intent, analogies, etc. of the answer to $question_X$ to assess the confidence value of the answer. Accordingly, as answers are received from the ground truth questions, each answer is assessed for a confidence value of that answer.

Following step (320), it is determined if the confidence value of the answer, e.g. answer$_X$, is greater than the threshold T with respect to a high confidence answer (322). A positive response to the determination at step (322) is followed by an increment of the variable N (324). The set of answers that are associated with variable N are sorted based on their corresponding confidence values (326), and the highest answer in the sort is compared to the answer defined in the ground truth (328). It is then determined if the highest answer and the ground truth match (330). A positive response to the determination at step (330) is followed by an increment of the variable S corresponding to reliable answers (332). Following either step (332), or a negative response to the determinations at step (322) or (330), the ground truth question counting variable X is incremented (334). It is then determined if there are any remaining ground truth questions for submission to source$_A$ (336). If there are ground truth questions remaining for submission, the process returns to step (318). However, if all of the ground truth questions have been submitted to source$_A$, the value of the variable S is assigned to the variable S$_{Total}$ (338) and the value of the variable N is assigned to the variable N$_{Total}$ (340). Using these variables assignment, a source reliability score is calculated as the quotient of the value of S$_{Total}$ and N$_{Total}$ (342), e.g. reliability of source$_A$ is:

$$S_{Total}/N_{Total}$$

Accordingly, the ground truth questions and corresponding answers are utilized to assess the reliability of one or more sources.

Figure 4:
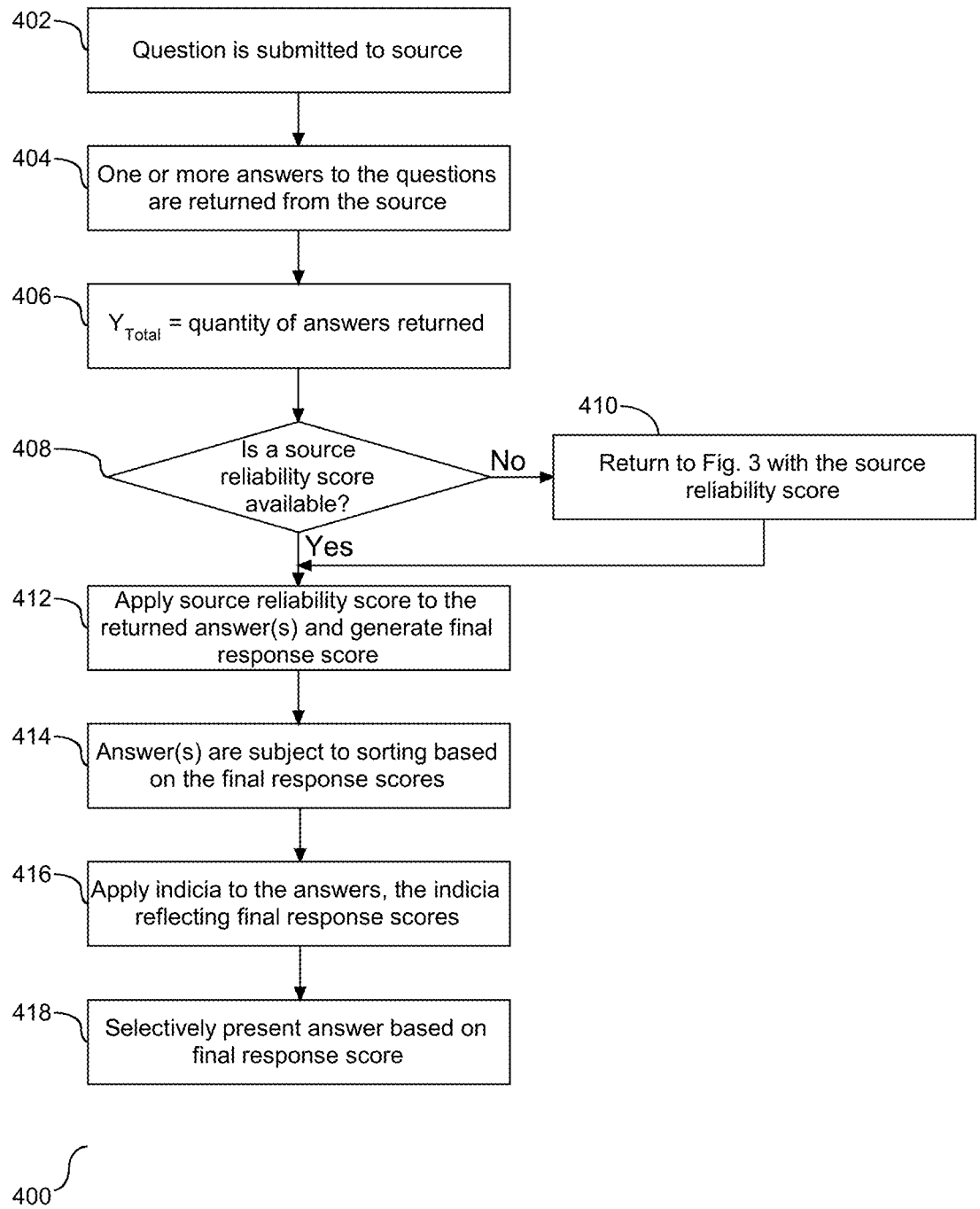
FIG. 4 depicts a flow chart illustrating a process for application of the source reliability score.

As shown collectively in FIGS. 3A and 3B, an assessment is conducted to identify a reliability of the source and to associate a numerical value with the reliability. In one embodiment, the numerical value is referred to as a source reliability score. Referring to FIG. 4, a flow chart (400) is provided to demonstrate application of the source reliability score. As shown, a question is submitted to a source (402), and one or more answers in the form of response data is returned from the source (404). The quantity of answers returned at step (404) is assigned to the variable Y$_{Total}$ (406). The source utilized at steps (402) and (404) may be the same source that was assessed in FIGS. 3A and 3B, e.g. source$_A$, or in one embodiment, the source may be a different source. After the response data is received, it is determined if there is a source reliability score available (408). In one embodiment, the determination at step (408) may assess how recent any reliability assessment may have been conducted. A negative response to the determination at step (408) is an indication that either the source being utilized for the query processing either does not have a reliability assessment or any previously conducted assessment is considered overdue, and the process returns to FIGS. 3A and 3B for a dynamic assessment or re-assessment of the source processing the query (410), followed by a return to step (412) when the source reliability score has been assessed or otherwise made available. Accordingly, prior to applying the source reliability score to a query, the source in support of the query may require a dynamic assessment or re-assessment of its reliability.

Following a positive response to the determination at step (408) or following the dynamic assessment, or in one embodiment re-assessment, at step (410), the source reliability score is applied to the response data, e.g. answer(s), returned from the source (412). The application at step (412) generates a final response score as a product of an answer occurrence score and the source reliability score. The answer occurrence score is a value that reflects how well a document in the source answered the question. In one embodiment, NLP techniques are utilized to assign an answer occurrence score to the response data. Such NLP techniques may include matching components of the submitted question with the response data, with examples of such components being grammatical terms, intent, analogies, etc. The return answers are subject to a sorting based on their associated final response scores (414). It is understood that there may be multiple occurrences of the same answer in different documents within the source, and the final score reflects how well the question was answered. In one embodiment, the indicia is applied to the responses (416) with the indicia reflecting the final response scores to indicate reliability of the response or document that provided the response. Examples of the applied indicia include, but are not limited to, a value, symbol, and/or a visible property or characteristic. Based on the value of the final response score, one or more responses are selectively presented as an answer to the submitted question (418). Accordingly, as demonstrated as a question is submitted to a source for an answer, the reliability score is applied to the answer as a factor in the final score assessment.

As shown in FIGS. 3A, 3B, and 4, the source reliability is utilized as a factor in evaluating response data. It is understood that a source may be in the form of a library or corpus of documents. As documents are added or removed, the reliability of the source is subject to change, and in one embodiment, may be a factor for initiating a re-assessment of the source. However, it is important that documents be subject to a vetting process before being accepted to the source. In other words, documents are selectively added to the source based on reliability of the document.

Figure 5A:
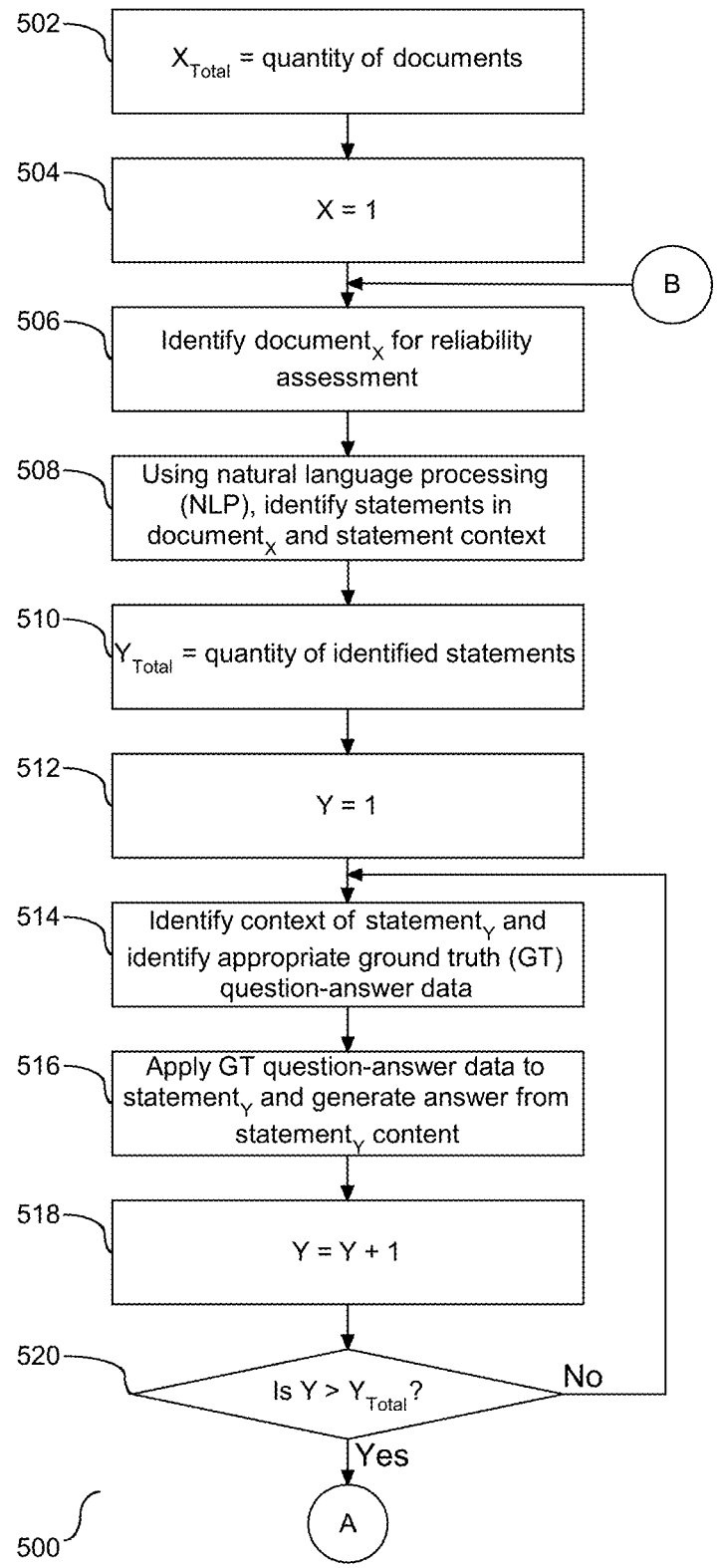
FIGS. 5A and 5B collectively depict a flow chart illustrating a process for assessing reliability of a document.
Figure 5B:
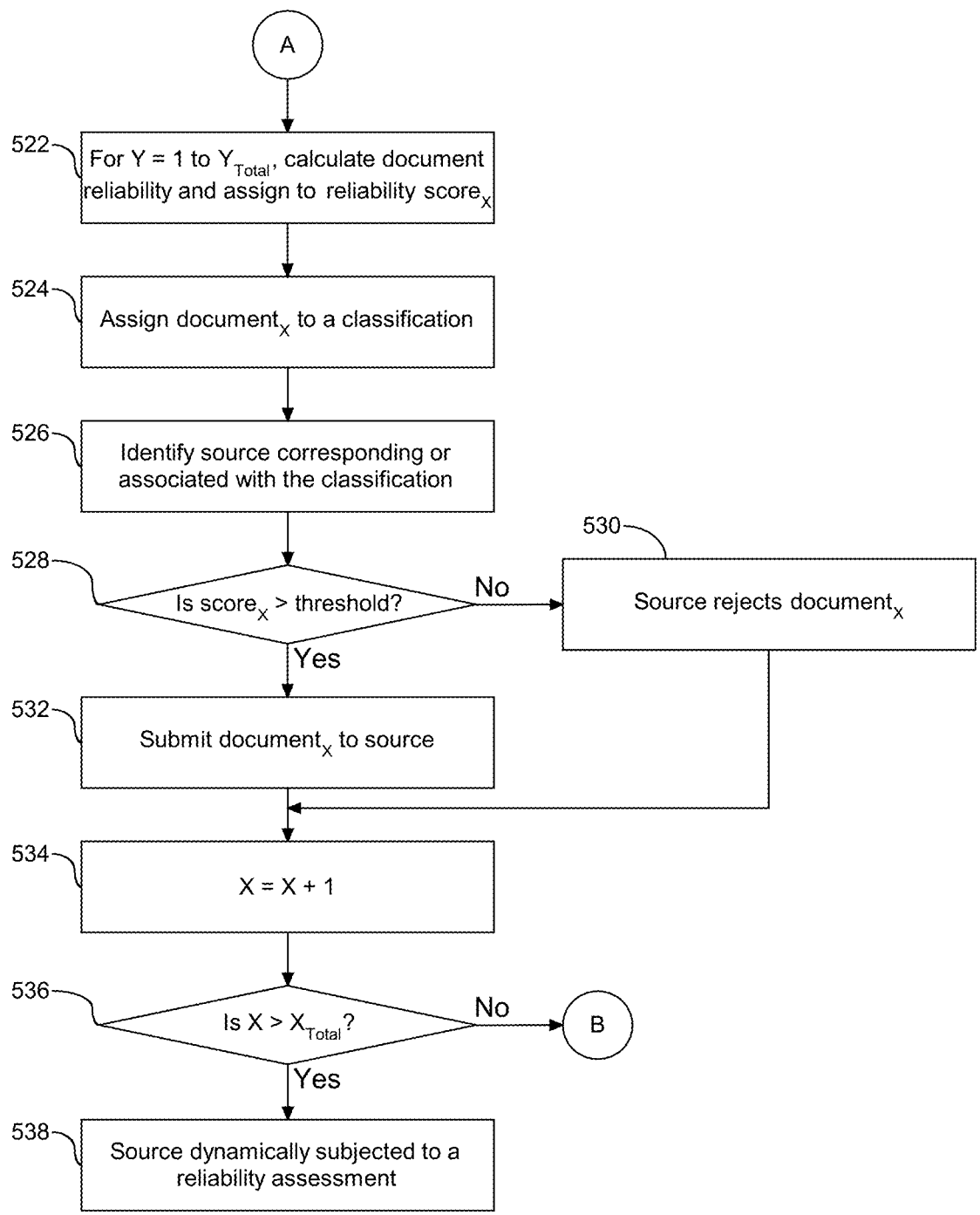

Referring to FIGS. 5A and 5B, a flow chart (500) is provided to illustrate a process for assessing reliability of a document. One or more documents or files are identified for submission to a source. Prior to the submission, the document(s) or file(s), hereinafter referred to collectively as document(s), the document(s) are assessed for reliability. The variable X$_{Total}$ is assigned to the quantity of documents identified for submission to one or more sources (502), and a corresponding document counting variable, X, is initialized (504). Document$_X$ is identified for reliability processing (506). One or more natural language processing (NLP) tools are utilized to identify statements in document$_X$, as well as the context present within the identified statement(s) (508). A statement counting variable, Y$_{Total}$ is assigned to the quantity of identified statements (510), and a corresponding statement counting variable, Y, is initialized (512). The context of statement$_Y$ is identified and employed to identify appropriate and ground truth question-answer data that is relevant to the statement context (514). The identified ground truth question-answer data is applied to statement$_Y$, and an answer from content within statement$_Y$ or document$_X$ is generated (516). Following step (516), the statement counting variable, Y, is incremented (518), and it is determined if each of the identified statements in the document, document$_X$, has been subject to the ground truth evaluation (520). A negative response to the determination at step (520) is followed by a return to step (514) for continued statement ground truth processing, and a positive response concludes the statement ground truth processing for the document, document$_X$. Accordingly, for the document subject to reliability assessment, statements are identified and subject to ground truth processing.

After all of the statements in the document have been assessed with respect to the applied ground truth question-answer data, the document is subject to a reliability assessment. More specifically, all of the statement response data for the document are compiled and utilized for a document reliability assessment calculation, with the calculation assigned to a document reliability score, e.g. score$_X$, (522). It is understood that different sources, such as folders, libraries, etc., may have different standards for document acceptance with respect to the assessed reliability. Following step (522), the document, document$_X$, is assigned to a classification, which in one embodiment is determined by the ground truth taxonomy that corresponds to the ground truth question-answer data applied to the document statement (524). Using the assigned classification, a corresponding source is identified (526). It is then determined if the reliability score for the document, score$_X$, exceeds a defined threshold value for the identified source (528). A negative response to the determination at step (528) is followed by designating the document, document$_X$, as inappropriate for submission to the identified source, or in one embodiment, the source rejecting the document (530). However, a positive response to the determination at step (528) is followed by submitting the document, document$_X$, to the identified source (532). Following either step (530) or step (532), the document counting variable is incremented (534), and an assessment if all of the documents designated for reliability evaluation have been assessed (536). A negative response to the determination at step (536) is followed by a return to step (506), and a positive response is followed by an assessment, or in one embodiment a re-assessment, of the source with respect to a reliability (538) as the addition of one or more documents to the source may alter the reliability score of the source. Accordingly, documents and document statements and context are subject to a reliability assessment.

Figure 6:
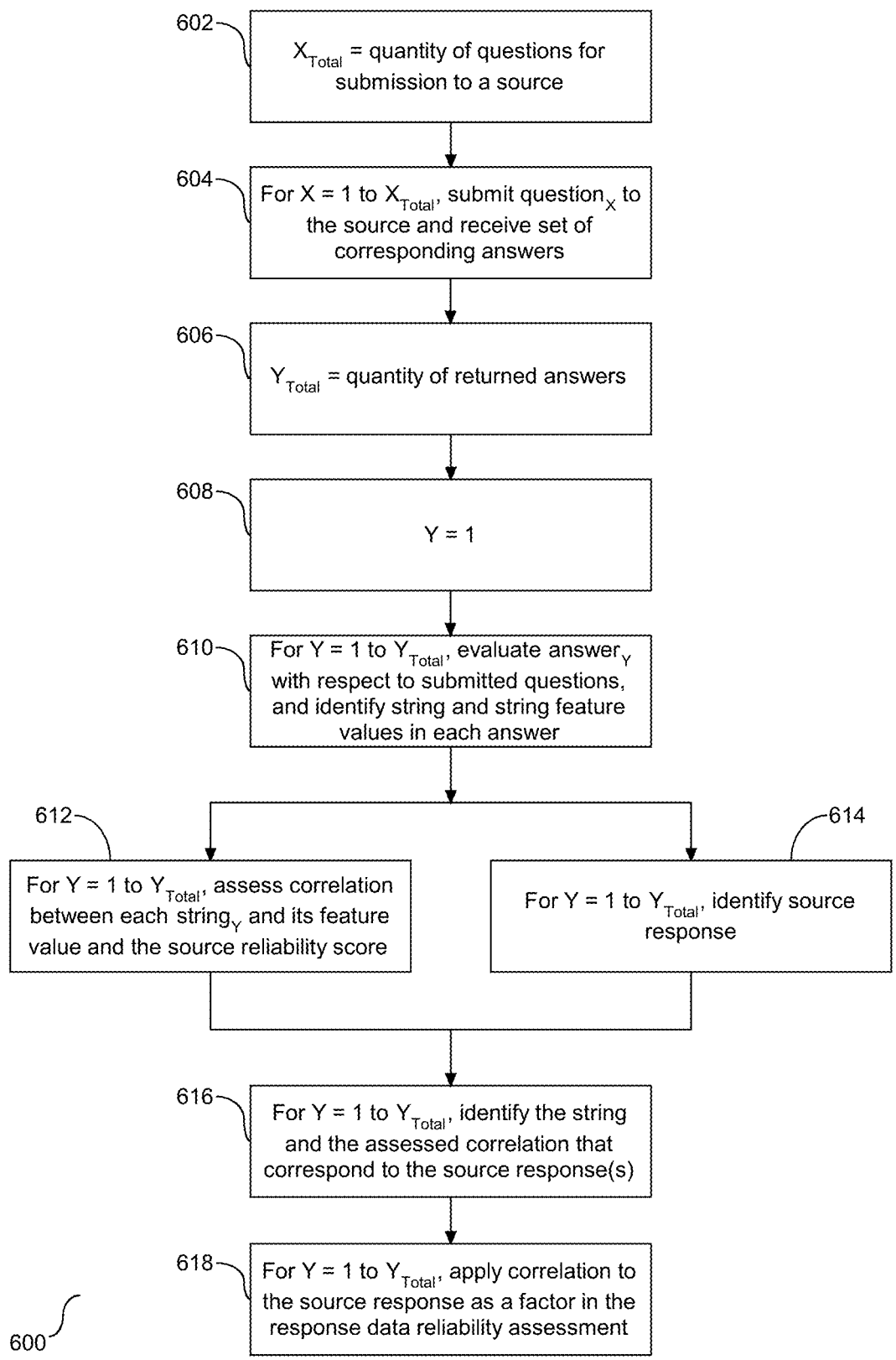
FIG. 6 depicts a flow chart illustrating a process for applying ML and a corresponding ML algorithm to the source.

Machine learning (ML) may be applied to the question submission with respect to the reliability factor. Referring to FIG. 6, a flow chart (600) is provided to illustrate a process of applying ML and a corresponding ML algorithm to the source. The variable $X_{Total}$ represents a set of questions for submission to the source (602). The questions are submitted to the source, and a set of corresponding answers are returned (604). The variable $Y_{Total}$ is assigned to the quantity of returned answers (606). A corresponding answer counting variable, Y, is initialized (608). The answers are evaluated with respect to the submitted questions, and more specifically to identify string and string feature values in each of the answers (610). A correlation is assessed between each string$_Y$ and its feature value(s) and the source reliability score (612). Separate from the correlation, the source response to the submitted question is identified (614), e.g. see FIG. 4. In addition, the string and the assessed correlation that correspond to the source response are identified (616). The assessed correlation is applied to the source response as a factor in the response data reliability assessment (618). For example, if the string has a strong correlation to the source response, then the applied factor will reflect the strong correlation, e.g. strong weight. Accordingly, the ML algorithm provides an additional factor of correlation to the source reliability score to influence response data.

Aspects of the ground truth assessment and processing shown in FIGS. 3A-6, employ one or more functional tools, as shown and described in FIG. 1. Aspects of the functional tools (152)-(158) and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the processes described above with respect to FIGS. 3A-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
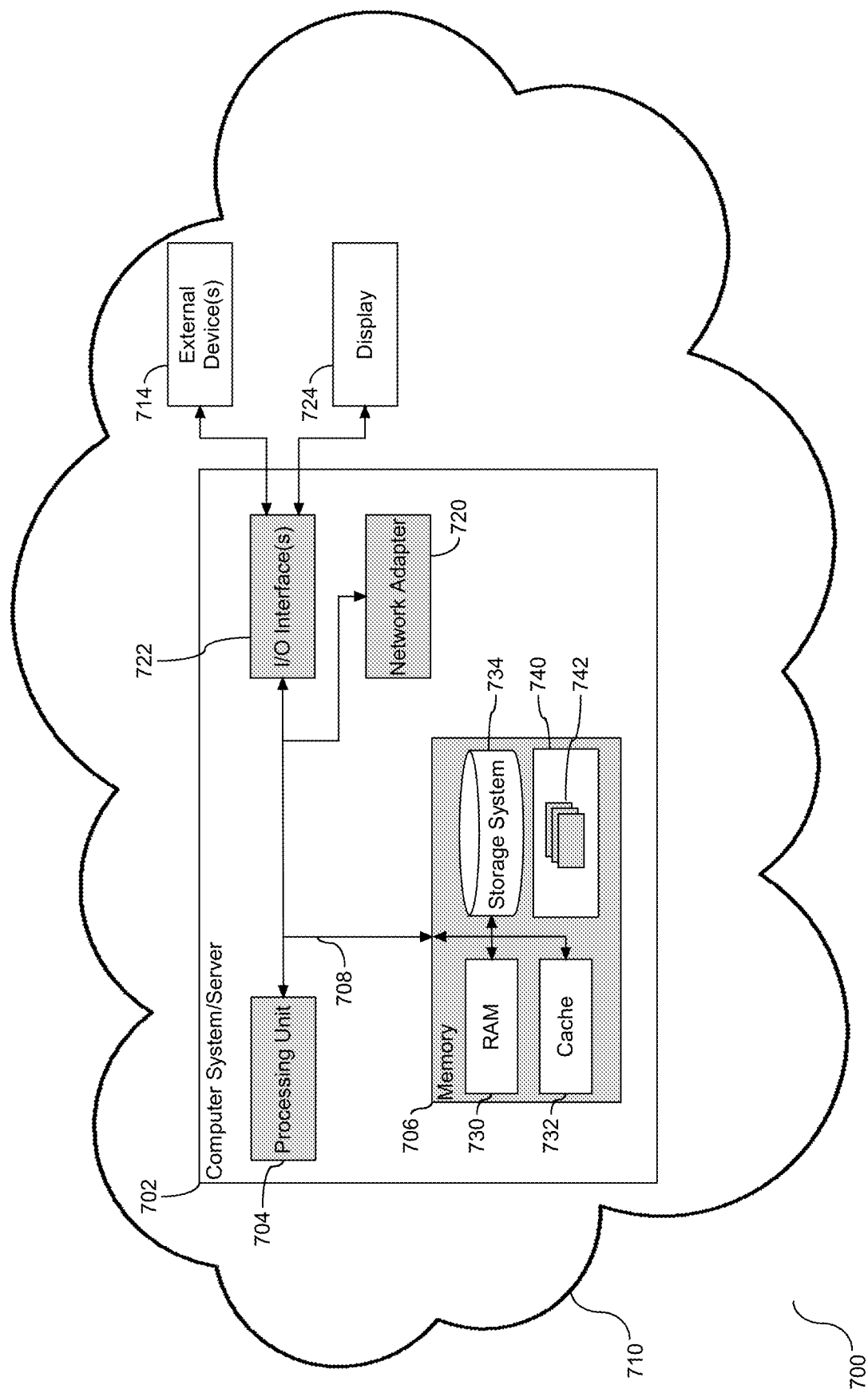
FIG. 7 depicts a block diagram illustrating an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to dynamically communication evaluation interrogatory identification and processing. For example, the set of program modules (742) may include the tools (152)-(158) as described in FIG. 1.

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
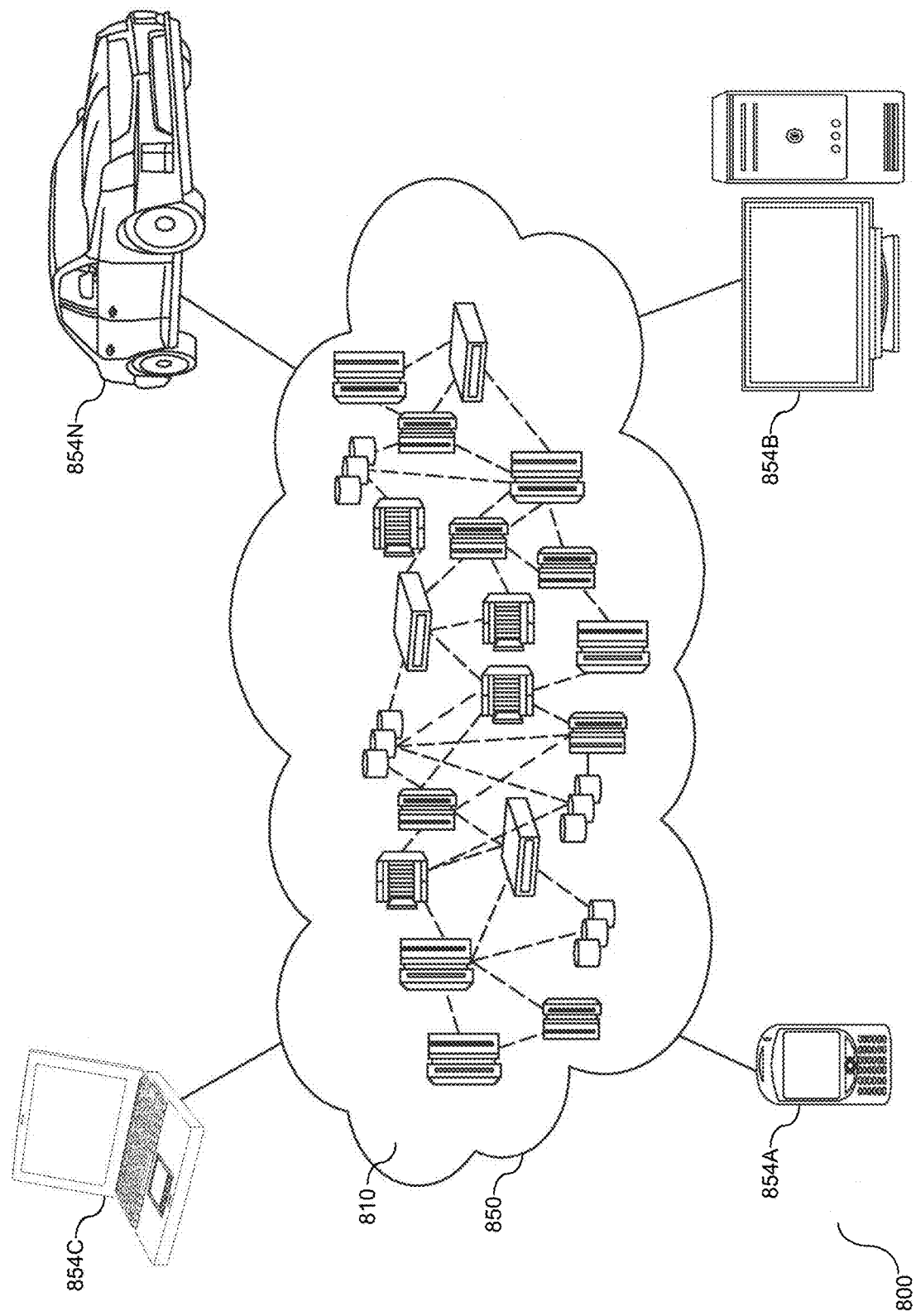
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
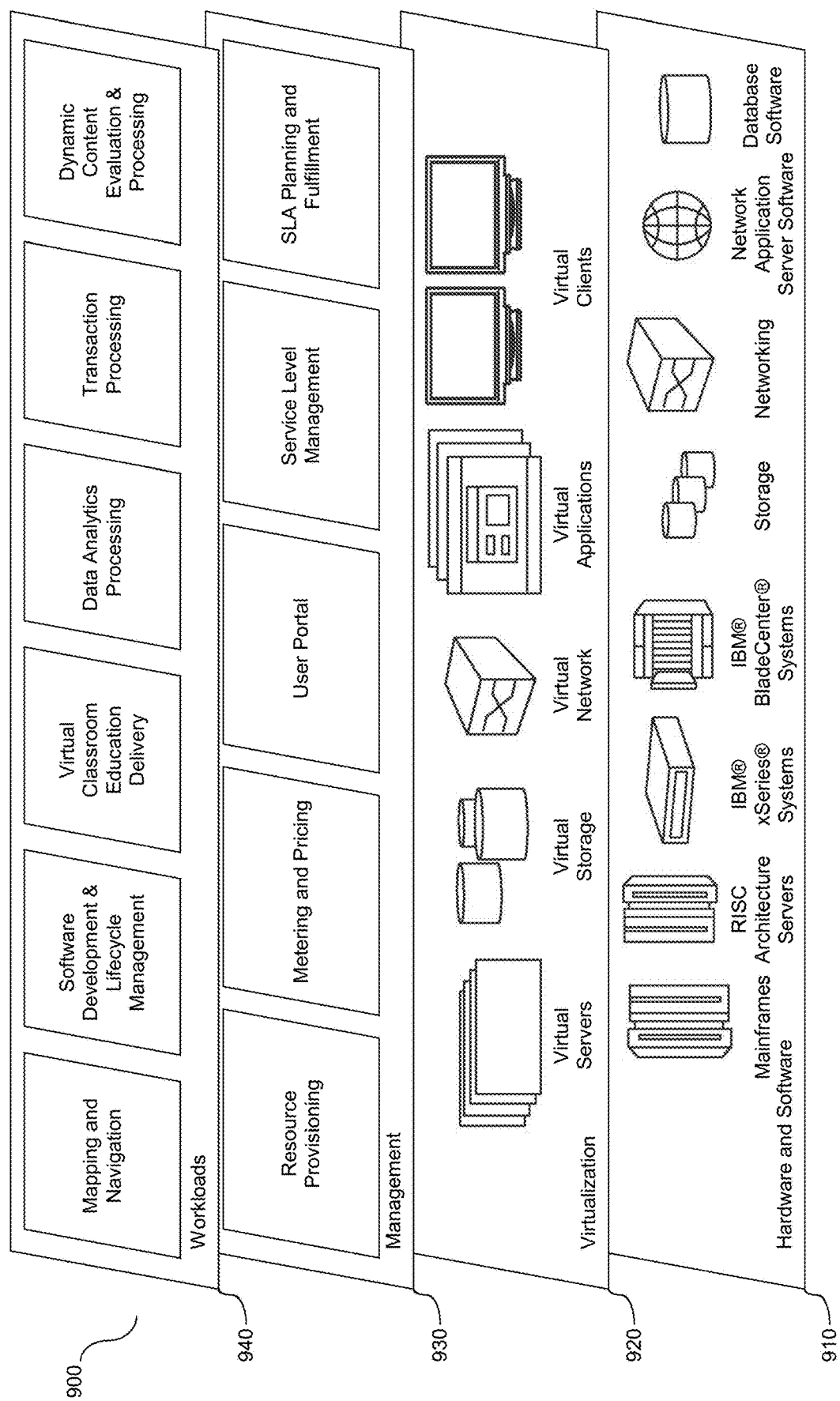
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic content evaluation and processing.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
   a processing unit operatively coupled to memory; and
   a knowledge engine, in communication with the processing unit, the knowledge engine configured to evaluate and apply source reliability, the knowledge engine comprising:
      an assessment manager configured to assess reliability of a source comprising a corpus of documents containing data, including:
         present ground truth question data to an answering system seeded with the documents of the source;
         receive source answer data with an associated confidence value from the answering system responsive to the presented ground truth question data;
         conduct a first evaluation of the received source answer data based upon the associated confidence value;
         conduct a second evaluation of the received source answer data based upon a comparison of the received source answer data to ground truth answer data associated with the presented ground truth question; and
         calculate a source reliability score of the source based on the first and second evaluations; and
      a director configured to dynamically apply the assessed source reliability to a submission, including:
         obtain source response data responsive to the submission;
         apply the source reliability score to the source response data; and
         selectively present the source response data based on the applied source reliability.

2. The system of claim 1, wherein the director is further configured to obtain two or more submission responses from two or more sources, including a first response obtained from a first source and a second response obtained from a second source, to calculate a first response reliability score and a second response reliability score, and to sort the first and second responses based on the first and second reliability scores.

3. The system of claim 2, wherein the director is further configured to apply indicia to the selectively presented response data, the applied indicia corresponding to the calculated response reliability scores.

4. The system of claim 1, further comprising a natural language processing (NLP) manager configured to observe a communication, apply natural language processing (NLP) to the communication, and identify submission data for presentation to the answering system seeded with the documents of the source.

5. The system of claim 1, wherein the dynamic application of the assessed source reliability to the response data further comprises the director configured to adjust a weighting of the source response data, wherein the adjustment corresponds to a confidence level associated with source reliability.

6. The system of claim 1, further comprising a machine learning (ML) manager configured to apply a machine ML algorithm to the source, including:
   evaluate a plurality of source answers to a submitted question, each source answer having string data with one or more feature values, the evaluation including an assessment of a correlation between each source answer feature value and the source reliability score; and apply the assessed correlation to the obtained source response data, wherein the correlation is a factor in the application of the source reliability score to the source response data.

7. A computer program product for dynamically assessing reliability, the computer program product comprising:
a computer readable storage medium having program code embodied therewith, the program code executable by a processor to:
assess reliability of a source comprising a corpus of documents containing data, including:
present ground truth question data to an answering system seeded with the documents of the source;
receive source answer data with an associated confidence value from the answering system responsive to the presented ground truth question;
conduct a first evaluation of the source answer data based upon the associated confidence value;
conduct a second evaluation of the received source answer data based upon a comparison of the received source answer data to ground truth answer data associated with the presented ground truth question; and
calculate a source reliability score of the source based on the first and second evaluations;
dynamically apply the assessed source reliability to a submission, including:
obtain source response data responsive to the submission; and
apply the source reliability score to the source response data; and
selectively present the source response data based on the applied source reliability.

8. The computer program product of claim 7, further comprising program code executable by the processor to obtain two or more submission responses from two or more sources, including a first response from a first source and a second response from a second source, calculate a first response reliability score and a second response reliability score, and sort the first and second responses based on the first and second reliability scores.

9. The computer program product of claim 8, further comprising program code executable by the processor to apply indicia to the selectively presented response data, the applied indicia corresponding to the calculated response reliability scores.

10. The computer program product of claim 7, further comprising program code executable by the processor to observe a communication, and apply natural language processing (NLP) to the communication, the NLP identifying submission data for presentation to the answering system seeded with the documents of the source.

11. The computer program product of claim 7, wherein the the program code to dynamically apply the assessed source reliability to the response data further comprises program code executable by the processor to adjust a weighting of the source response data, wherein the adjustment corresponds to a confidence level associated with source reliability.

12. The computer program product of claim 7, further comprising program code executable by the processor to apply a machine learning (ML) algorithm to the source, including program code executable by the processor to:
evaluate a plurality of source answers to a submitted question, each source answer having string data with one or more feature values, the evaluation including program code to assess a correlation between each source answer feature value and the source reliability score; and
apply the assessed correlation to the obtained source response data, wherein the correlation is a factor in the application of the source reliability score to the source response data.

13. A method for dynamically assessing reliability comprising:
assessing reliability of a source comprising a corpus of documents containing data, including presenting ground truth question data to an answering system seeded with the documents of the source, receiving source answer data with an associated confidence value from the answering system responsive to the presented ground truth question data, conducting a first evaluation of the source answer data based upon the associated confidence value, conducting a second evaluation of the received answer data based upon a comparison of the received source answer data to ground truth answer data associated with the presented ground truth question, and calculating a source reliability score of the source based on the first and second evaluations;
dynamically applying the assessed source reliability to a submission, including:
obtaining source response data responsive to the submission; and
applying the source reliability score to the source response data; and
selectively presenting the source response data based on the applied source reliability.

14. The method of claim 13, further comprising:
obtaining two or more submission responses from two or more sources, including a first response from a first source and a second response from a second source;
calculating a first response reliability score and a second response reliability score; and
sorting the first and second responses based on the first and second reliability scores.

15. The method of claim 13, further comprising:
observing a communication; and
applying natural language processing (NLP) to the communication, the NLP identifying submission data for presentation to the answering system seeded with the data from the source.

16. The method of claim 13, wherein the dynamic application of the assessed source reliability to the response data further comprises adjusting a weighting of the source response data, and wherein the adjustment corresponds to a confidence level associated with source reliability.

17. The method of claim 13, further comprising applying a machine learning (ML) algorithm to the source, including:
evaluating a plurality of source answers to a submitted question, each source answer having string data with one or more feature values, the evaluation including assessing a correlation between each source answer feature value and the source reliability score; and
applying the assessed correlation to the obtained source response data, wherein the correlation is a factor in the application of the source reliability score to the source response data.

18. The system of claim 1, wherein the assessment manager configured to calculate the source reliability score comprises the assessment manager configured to calculate the source reliability score using a dividend and a divisor, wherein the dividend corresponds to a first quantity of the received source answer data confidently answered in the first evaluation based upon the comparison of the received source answer data to the ground truth answer data, and wherein the divisor corresponds to a second quantity of the received source answer data correctly answered in the second evaluation based upon the associated confidence value.

19. The computer program product of claim 7, wherein the computer readable storage medium executable to calculate the source reliability score comprises computer readable storage medium executable by the processor to calculate the source reliability score using a dividend and a divisor, wherein the dividend corresponds to a first quantity of the received source answer data confidently answered in the first evaluation based upon the comparison of the received source answer data to the ground truth answer data, and wherein the divisor corresponds to a second quantity of the received source answer data correctly answered in the second evaluation based upon the associated confidence value.

20. The method of claim 13, wherein the calculating of the source reliability score comprises calculating the source reliability score using a dividend and a divisor, wherein the dividend corresponds to a first quantity of the received source answer data confidently answered in the first evaluation based upon the comparison of the received source answer data to the ground truth answer data, and wherein the divisor corresponds to a second quantity of the received source answer data correctly answered in the second evaluation based upon the associated confidence value.

\* \* \* \* \*